(12) United States Patent
Wittke

(10) Patent No.: US 12,192,568 B2
(45) Date of Patent: Jan. 7, 2025

(54) SYSTEMS AND METHODS FOR STORING PROGRAMS

(71) Applicant: Adeia Guides Inc., San Jose, CA (US)

(72) Inventor: David Gerald Wittke, Simi Valley, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/229,364

(22) Filed: Aug. 2, 2023

(65) Prior Publication Data

US 2024/0048797 A1 Feb. 8, 2024

Related U.S. Application Data

(63) Continuation of application No. 17/488,466, filed on Sep. 29, 2021, now Pat. No. 11,765,422, which is a
(Continued)

(51) Int. Cl.
| | |
|---|---|
| *H04N 21/433* | (2011.01) |
| *H04N 21/222* | (2011.01) |
| *H04N 21/442* | (2011.01) |

(52) U.S. Cl.
CPC ....... *H04N 21/4334* (2013.01); *H04N 21/222* (2013.01); *H04N 21/44222* (2013.01); *H04N 21/44226* (2020.08)

(58) Field of Classification Search
CPC ............. H04N 21/4334; H04N 21/222; H04N 21/44222; H04N 21/4383; H04N 21/4882;
(Continued)

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| | (Continued) | |

FOREIGN PATENT DOCUMENTS

| | | |
|---|---|---|
| EP | 1575285 A2 | 9/2005 |
| EP | 1788805 A2 | 5/2007 |

OTHER PUBLICATIONS

"IPRP", International Preliminary Report on Patentability of PCT/US2016/059396 dated Apr. 30, 2019 (10 pages), 10.
(Continued)

*Primary Examiner* — Fernando Alcon
(74) *Attorney, Agent, or Firm* — Haley Guiliano LLP

(57) ABSTRACT

Systems and methods are described for storing programs. For example, a media guidance application (e.g., executed on a server) may determine that a user has been watching a program (e.g., a movie) for longer than a particular time threshold (e.g., 20 minutes for a movie), and that the user has requested to access a different program (e.g., an episode of a series broadcast on another channel). In response to determining that the user has been watching the program (e.g., the movie) for longer than the particular time threshold (e.g., 20 minutes for the movie), and that the user has requested to access the different program (e.g., the episode of a series broadcast on another channel), the media guidance application may perform an action to store the initial program (e.g., the movie) before executing the request to access the different program.

20 Claims, 8 Drawing Sheets

Related U.S. Application Data continuation of application No. 17/097,606, filed on Nov. 13, 2020, now Pat. No. 11,159,843, which is a continuation of application No. 16/066,245, filed as application No. PCT/US2016/059396 on Oct. 28, 2016, now Pat. No. 10,869,084.

(58) Field of Classification Search
CPC ............... H04N 5/76; H04N 21/4147; H04N 21/44204; H04N 21/462; H04L 12/4625; H04L 12/2803

See application file for complete search history.

(56) References Cited

U.S. PATENT DOCUMENTS

| | | | |
|---|---|---|---|
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 9,510,047 B2 | 11/2016 | Arai et al. | |
| 9,788,069 B1 | 10/2017 | Pontual et al. | |
| 10,869,084 B2 | 12/2020 | Wittke | |
| 11,159,843 B2 | 10/2021 | Wittke | |
| 11,765,422 B2 | 9/2023 | Wittke | |
| 2002/0152459 A1 | 10/2002 | Bates et al. | |
| 2002/0168178 A1 | 11/2002 | Rodriguez et al. | |
| 2002/0174430 A1 | 11/2002 | Ellis et al. | |
| 2003/0110514 A1 | 6/2003 | West et al. | |
| 2004/0101280 A1 | 5/2004 | Tobiishi | |
| 2005/0251827 A1 | 11/2005 | Ellis et al. | |
| 2007/0047905 A1 | 3/2007 | Ahn | |
| 2008/0025694 A1 | 1/2008 | Kang | |
| 2008/0148333 A1 | 6/2008 | Kim et al. | |
| 2009/0089832 A1 | 4/2009 | Kendall | |
| 2010/0046931 A1 | 2/2010 | Takao et al. | |
| 2010/0153885 A1 | 6/2010 | Yates | |
| 2010/0218231 A1 | 8/2010 | Frink et al. | |
| 2010/0262986 A1* | 10/2010 | Adimatyam | H04N 21/4667 725/40 |
| 2014/0049695 A1 | 2/2014 | Papish et al. | |
| 2014/0282758 A1 | 9/2014 | Yu et al. | |
| 2014/0282759 A1* | 9/2014 | Harvey | H04N 21/4668 725/89 |
| 2014/0282790 A1 | 9/2014 | Stephens et al. | |
| 2014/0373057 A1 | 12/2014 | Hoffert et al. | |
| 2015/0037011 A1* | 2/2015 | Hubner | H04N 21/4147 386/264 |
| 2015/0271437 A1 | 9/2015 | Orlando et al. | |
| 2015/0289023 A1* | 10/2015 | Richman | H04N 21/44 725/32 |
| 2016/0055879 A1 | 2/2016 | Arai et al. | |
| 2016/0080780 A1* | 3/2016 | Öman | H04N 21/2393 725/10 |
| 2016/0105697 A1 | 4/2016 | Lee et al. | |
| 2016/0261922 A1 | 9/2016 | Adderly | |
| 2017/0026671 A1* | 1/2017 | Neumeier | G06F 16/7847 |
| 2017/0142480 A1* | 5/2017 | Gupta | H04N 13/167 |
| 2017/0214975 A1 | 7/2017 | Schmidt et al. | |

OTHER PUBLICATIONS

"ISR and Written Opinion", International Search Report and Written Opinion of PCT/US2016/059396 dated Jan. 5, 2017 (15 pages), 15.

* cited by examiner

SYSTEMS AND METHODS FOR STORING PROGRAMS

CROSS-REFERENCE TO RELATED APPLICATIONS

This application is a continuation application of U.S. patent application Ser. No. 17/488,466, filed Sep. 29, 2021, which is a continuation application of U.S. patent application Ser. No. 17/097,606, filed Nov. 13, 2020, now U.S. Pat. No. 11,159,843, which is a continuation application of U.S. patent application Ser. No. 16/066,245, filed Jun. 26, 2018, now U.S. Pat. No. 10,869,084, which is a national stage application under 35 U.S.C. § 371 of International Application PCT/US2016/059396, filed Oct. 28, 2016, each of which is hereby incorporated by reference herein in its entirety.

BACKGROUND

Users who interact with interactive media systems are often multitasking, and when watching media assets risk getting distracted or interrupted by other users and events. For example, a user may be watching a media asset on an interactive media system in their home, but may have to leave the home unexpectedly to pick up children from soccer practice which ended early. In another example, a user may be watching a media asset on an interactive media system in their home and another user may come home and request a channel change. Some systems in the related art allow users to schedule recordings ahead of time. For example, some systems in the related art allow users to select certain programs for recording if the user misses the beginning of these programs.

However, conventional systems lack the ability to detect an unplanned change in user activity, such as, e.g., leaving the home, answering a phone call, another user coming in, and accordingly do not provide the user with any alternatives to missing the remainder of the media asset which was being watched prior to any interruption.

Accordingly, systems and methods are described herein for storing programs. These systems and methods may be implemented by a media guidance application (e.g., a server). For example, a media guidance application may determine that a user has been watching a program (e.g., a movie) for longer than a particular time threshold (e.g., 20 minutes for a movie), and may determine that the user has requested to access a different program (e.g., an episode of a series broadcast on another channel). In response to determining that the user has been watching the program (e.g., the movie) for longer than the particular time threshold (e.g., 20 minutes for the movie), and that the user has requested to access the different program (e.g., the episode of a series broadcast on another channel), the media guidance application may perform an action to store the initial program (e.g., the movie) before executing the request to access the different program. As one example, Joe has been watching "Mission Impossible" for 30 minutes when Jill comes home and changes the channel to watch CNN. The media guidance application may perform an action to store "Mission Impossible" such that Joe can later resume watching "Mission Impossible", prior to executing the channel change that Jill requested to watch CNN.

In some embodiments, the media guidance application may store a database that includes a plurality of access time threshold entries, each with a corresponding access time threshold field and a media characteristic field. For example, the database may include an access time threshold entry of "20 minutes" for a movie, and a corresponding media characteristic field which is "movie." The database may also include an access time threshold entry for a series episode with an access time threshold field of "5 minutes," and a corresponding media characteristic field which is "episode." An access time threshold entry may have an access time threshold field which ranges from a few seconds to a few minutes, to an hour. An access time threshold field may be a percentage of the length of a media asset. For example, for an access time threshold entry with a media characteristic field of "movie," the associated access time threshold field may be defined as "25%" of the run time for the movie. In another example, for an access time threshold entry with a media characteristic field of "documentary," the access time threshold field may be defined as "10%" of the run time for the documentary.

The media guidance application may access, at a first time, a media asset received from a content source. For example, the media guidance application may access a movie received from a media-on-demand server. In this example, a user may use the media guidance application to request to access the movie "Mission Impossible, III" from a media-on-demand server. In another example, a user may use the media guidance application to request to tune to a particular channel, e.g., PBS, and access the program currently being broadcast on that particular channel, e.g., "Downton Abbey."

The media guidance application may determine a length of time the media asset has been accessed since the first time based on a difference between a current time and the first time. For example, the media guidance application may determine that the current time is 8:30 pm, and that a user first accessed "Mission Impossible HI" at 8:05 pm. The media guidance application may determine from metadata associated with the media asset what the first time the media asset was accessed was. The media guidance application may also determine from metadata associated with the user requests what the first time the media asset was accessed was. For example, the media guidance application may determine from metadata associated with "Mission Impossible III" that "Mission Impossible III" started at 8:00 pm. In another example, the media guidance application may determine from metadata associated with a user request for "Mission Impossible III" that the user requested to access "Mission Impossible III" at 8:05 pm. For example, the media guidance application may determine from an external source what the current time is. For example, the media guidance application may determine from the world clock a current time. In another example, the media guidance application may determine the current time from an internal clock, or from another device. The media guidance application may determine a difference between the current time, e.g., 8:30 pm, and the first time, e.g., 8:05 pm, and determine a length of time the media asset has been accessed since the first time, e.g., 25 minutes. For example, the media guidance application can subtract 08:05 from 08:30 and obtain the difference, which is 00:25.

The media guidance application may determine a characteristic of the media asset based on metadata associated with the media asset. For example, a movie such as "Mission Impossible III" may have metadata including the media asset type, e.g., "movie," "action movie," "action and adventure," "Tom Cruise" or any other characteristic of a type of the media asset, and/or of a particular media asset.

The media guidance application may search the media characteristic fields of the plurality of access time threshold entries stored in the database to identify a given media characteristic field having a value that matches the determined characteristic. For example, if the determined characteristic of the movie "Mission Impossible III" is "action movie," the media guidance application may search the access time threshold entries by searching through the media characteristic fields of the plurality of access time threshold entries, e.g., "movie," "documentary," "episode," "action," etc., stored in the database to identify a given media characteristic field that matches "action movie." In another example, if the determined characteristic of the media asset is "documentary,", the media guidance application may search the media characteristic field of the plurality of access time threshold entries, e.g., "movie," "documentary," "episode," "action," etc., stored in the database to identify a given media characteristic field that matches "documentary."

The media guidance application may retrieve a threshold value stored in the access time threshold field that is associated with the identified given media characteristic field for a given access time threshold entry. For example, for the movie "Mission Impossible III" with a determined characteristic of "action movie," for the access time threshold entry selected by the media guidance application because the media characteristic field matches "action movie," the access time threshold value stored in the access time threshold field associated with the identified given media characteristic field "action movie" may be "10 minutes." In another example, for the access time threshold entry selected by the media guidance application because the media characteristic field matches "documentary," the threshold value stored in the access time threshold field associated with the identified given media characteristic field "documentary" may be "20 minutes."

The media guidance application may compare the determined length of time to the retrieved threshold value. For example, for the movie "Mission Impossible III" with a determined characteristic of "action movie," if for a given access time threshold entry the threshold value stored in the access time threshold field associated with the identified given media characteristic field "action movie" is "10 minutes" and the media guidance application has determined that the length of time the media asset, e.g., "Mission Impossible III," has been accessed since the first time is 25 minutes, the media guidance application may compare the determined length of time "25 minutes" to the time threshold "10 minutes."

The media guidance application may, in response to determining that the determined length of time exceeds the retrieved threshold value, determine whether a user request to access a different media asset from a different content source is received. For example, the media guidance application determines that the length of time the media asset, e.g., "Mission Impossible III," has been accessed since the first time is 25 minutes, and the media guidance application determines that the determined length of time "25 minutes" is greater than the value stored in the access time threshold field associated with the identified given media characteristic field "action movie," which is "10 minutes." In this example, the media guidance application determines whether a user request to access a different media asset from a different content source is received. For example, a different media asset from a different content source may be a media asset on a different channel, a broadcast media asset instead of a media-on-demand media asset, a local media asset instead of a remote media asset, etc. For example, a user watching "Mission Impossible III" from a media-on-demand server may request to access "Downton Abbey" from the PBS channel by navigating the media guidance application.

The media guidance application may, in response to determining that the user request to access the different media asset has been received, perform an action corresponding to storage of the media asset before executing a command corresponding to the user request to access the different media asset. For example, in response to determining that the user, e.g., requested to access a different channel, the media guidance may perform an action corresponding to storage of the media asset. For example, the media guidance application may store a link or pointer to a stored copy of the media asset, or the media guidance application may download locally a remote recording of the media asset, or the media guidance application may record remotely the media asset. For example, for the user previously watching "Mission Impossible III" who requested to now watch "Downton Abbey," and the media guidance application may store a local copy of "Mission Impossible III" obtained from the media-on-demand server which was the content source for "Mission Impossible III." The media guidance application may provide a prompt to a user to decide whether to record the media asset before executing a command corresponding to the user request to access the different media asset. The action corresponding to storage of the media asset may include generating for display the prompt, and/or an action corresponding to a user selection of an option to record as indicated on the prompt, e.g., by a "yes" selectable button.

The media guidance application may perform this action corresponding to storage of the media asset before executing a command corresponding to the user request to access the different media asset, e.g., a channel change, a selection of a different device or network, etc. For example, after receiving the user request to change from "Mission Impossible III" on the media-on-demand server to "Downton Abbey" on PBS, and before storing a local copy of "Mission Impossible III" locally, the media guidance application may generate for display a prompt asking the user to confirm the user interest in later continuing to watch "Mission Impossible III." For example, such a prompt may be "Will you want to watch this later," and the prompt may generated for display with selectable options, such as "yes" or "no" selection options.

In some embodiments, the characteristic of the media asset includes at least one of a title, a genre, a category, a duration, a size, a popularity, and a quality. For example, the characteristic of the movie "Mission Impossible III" may be "Mission Impossible III," "action and adventure," "Over 2 hours," "Over 1.3 MB," ">3 stars," or "HD." Similarly, for a documentary "Winged Migration," the characteristic may be "Winged Migration," "documentary," "over 1 hour," "SD," or ">7.0." The characteristic of the media asset may also include the name of a director, the name of actors, the name of characters, the name of awards associated with the media asset, a year of the media asset, etc. For example, for the movie "Jack Reacher," a characteristic may be "Jack Reacher," "Tom Cruise," "2016," or "Edward Zwick."

In some embodiments, the media guidance application may determine whether the user request to access a different media asset from the different content source is received by monitoring commands received from a user input device. For example, the media guidance application may monitor commands received from a user input device, e.g., a remote control, a set-top box, etc. In another example, the media guidance application may monitor commands received from household appliances such as a lighting system, door sensors, window sensors, pressure sensors, etc. For example, the media guidance application may monitor signals received from a user input device such as a remote control, or a window sensor. The media guidance application may receive signals comprising status updates from the user input device at fixed time intervals. For example, the media guidance application may receive a "channel up" command from a user input device, e.g., a remote device.

The media guidance application may also determine whether the user request to access a different media asset from the different content source is received by searching a list of commands associated with access to different content to determine whether any command received from the user input device matches any of the commands stored in the list. The media guidance application may determine whether the "channel up" command is present in a list of commands associated with access to different content. For example, the list of commands may include "channel up," "switch," "try new," "watch similar," "watch next," "see popular," etc. In another example, the list of commands may also include combinations of commands, including commands defined as a combination of conditions, e.g., a light sensor, a door sensor, and a remote control function. The media guidance application may allow a user to define commands generated by a user input device and to add these commands to the list of commands associated with access to different content. For example, a user may define that pressing a "*" key on a user input, e.g., a remote control, is a command to access similar content. For example, the user could press the "*" key while watching "Lord of the Rings I" being broadcast, to access an available and related asset, e.g., "Lord of the Rings II" as media-on-demand. In another example, a user may input via the media guidance application that when "LivingRoomLightSensor=Off" and "TVTurnedOff," this constitutes a command which is part of the list.

In some embodiments, the command received from the user input device includes a channel change command. For example, the command received from the user input device, e.g., a remote control or a keyboard, may be an "up arrow" command, a "down arrow" command, or a selection of a selectable icon "next channel" generated for display on a screen.

In some embodiments, the media guidance application performing the action comprises the media guidance application automatically storing the media asset on a storage device. For example, the media guidance application may receive the command corresponding to one of the commands associated with access to different content and may automatically store a copy of the media asset on a storage device, without prompting the user whether to record the media asset. In another example, the media guidance application may automatically store a copy of the media asset on a storage device, prior to prompting the user on whether to record the media asset, and subsequently continue to store, and/or delete the previously stored copy of the media asset. For example, a user watching "Lord of the Rings I" may select the "up arrow" command on their remote, and the media guidance application may automatically begin to record "Lord of the Rings I" while prompting the user "Would you like to record 'Lord of the Rings' before changing channels?" In the event that the user confirms an intent to record "Lord of the Rings", the media guidance application may continue to record "Lord of the Rings I," or alternatively the media guidance application may download a media-on-demand version of "Lord of the Rings I." In the event that the user indicates that they does not wish to record "Lord of the Rings I" prior to changing channels, the media guidance application may both change channels as requested by the command corresponding to the user input, and may also delete any portion of "Lord of The Rings I" recorded prior to receiving confirmation of the user's intent.

In some embodiments, the media guidance application performing the action may generate a prompt for presentation to the user that includes a first option to store the media asset before executing the command corresponding to the user request, and a second option to execute the command corresponding to the user request without storing the media asset. For example, the media guidance application may prompt the user "Do you wish to record 'Winged Migration' before changing channels?", and the prompt may include selectable options "Yes" and "No." In this example, if the media guidance application receives a command corresponding to a selection of the "Yes" selectable option, the media guidance application may store the media asset ("Winged Migration") prior to changing the channel. Alternatively, in this example, if the media guidance application receives a command corresponding to a selection of the "No" selectable option, the media guidance application may immediately change channels without recording "Winged Migration."

In some embodiments, the media guidance application determining whether the user request to access a different media asset from the different content source is received may comprise the media guidance application monitoring external components. For example, the user request to access a different media asset may be received from a combination of internal and/or external components. For example, the user request to access a different media asset may be a combination of a user input to "mute" the media asset, and the lights being turned off in a room where the media asset is generated for display, e.g., "TVRoomLightsOff=Yes." in another example, the user request to access a different media asset may be a combination of the garage door opening, e.g., "GarageOpen=Yes" and the lights being on in the kitchen, e.g., "KitchenLightOn=Yes." Alternatively, the user request to access a different media asset may be a combination of the media guidance application being tuned to a particular channel (e.g., NHL Network, "IsChannelNHL=Yes"), and the doorbell ringing, e.g. "DoorbellSound=Yes."

In some embodiments, the media guidance application monitoring external components may comprise receiving status information from each of the external components over a network. For example, status information may be received from each external component over a home network or the Internet. For example, all household appliances may be connected to the home network, which receives periodic status updates about the appliances, e.g., doorbell, garage door, oven, lights, windows, etc.

In some embodiments, the media guidance application may determine whether a combination of the status information from each of the external components over a network matches a predefined state. For example, monitoring external components may include monitoring external components for status updates that occur within a threshold period of time of each other. For example, the media guidance application may determine whether the time stamp of a given status update from one external component is within a threshold of a time stamp of another status update from another external component. The time stamps may be retrieved for each status update from a database entry corresponding to the external component which stores the time stamp and the status information for each external component. The threshold period of time may be user defined, automatically set, predefined, and/or adjusted dynamically based on time of day and/or on which external component provides the status information. For example, the media guidance application may receive status information from a garage door at a first point in time. Later, the media guidance application may receive status information from a doorbell at a second point in time that is five minutes after the first point in time. In some implementations, the threshold period of time may be ten minutes. As such, because the status information from the doorbell was received five minutes after the status information from the garage door, the media guidance application may determine that a certain condition has been met, that a certain command has been received, based on a combination of the status information from the garage door and the doorbell at a specific time interval. Automatically performing media actions based on the status of external components is described in further detail in U.S. patent application Ser. No. 14/463,805, which is herewith incorporated by reference in its entirety In some embodiments, the external components may include a plurality of in-home appliances. For example, the external components may include in-home appliances (e.g., refrigerators, ovens, garage doors, doorbells, front doors, etc.). In some embodiments, the media action may be determined to be associated with the status information when a combination of status information from a first and a second external component is indicative of the user leaving or entering a location of the internal and/or external components (e.g., a home with in-home appliances and peripheral devices such as alarm sensors, wireless fence, etc.).

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED. DESCRIPTION

Systems and methods are described herein for storing programs. These systems and methods may be implemented by a media guidance application (e.g., a server). For example, a media guidance application may determine that a user has been watching a program (e.g., a movie) for longer than a particular time threshold (e.g., 20 minutes for a movie), and may determine that the user has requested to access a different program (e.g., an episode of a series broadcast on another channel). In response to determining that the user has been watching the program (e.g., the movie) for longer than the particular time threshold (e.g., 20 minutes for the movie), and that the user has requested to access the different program (e.g., the episode of a series broadcast on another channel), the media guidance application may perform an action to store the initial program (e.g., the movie) before executing the request to access the different program. As one example, Joe has been watching "Mission Impossible III" for 30 minutes when Jill comes home and changes the channel to watch CNN. The media guidance application may perform an action to store "Mission Impossible III" such that Joe can later resume watching "Mission Impossible III," prior to executing the channel change so Jill can watch CNN.

Figure 1:
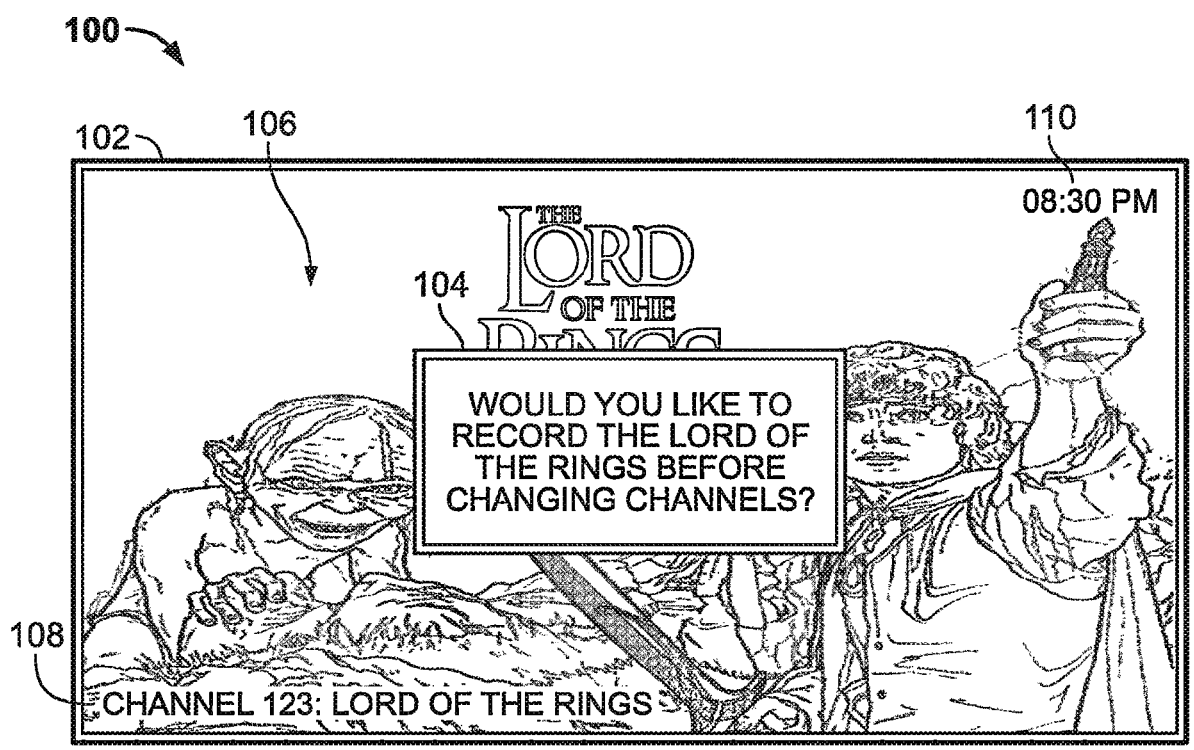
FIG. 1 shows an illustrative example of a display for a recording prompt, in accordance with some embodiments of the disclosure.

FIG. 1 is an illustrative example of a display for a recording prompt, in accordance with some embodiments of the disclosure, Display 100 includes a display area 102, on which content 106 is generated for display. For example, display 100 may be a screen device, with display area 102 being a window which may cover the entirety of the screen device, or a portion of the screen device. For example, content 106 may be a movie currently being broadcast, such as "Lord of the Rings I." Display 100 may also include a media source indication 108, and a time stamp 110. For example, display 100 may include a media source indication 108 which indicates that the movie "Lord of the Rings I" is being broadcast from Channel 123. For example, display 100 may include a time stamp 110 which indicates the current time, "08:30 pm."

When the media guidance application receives a user input corresponding to a request to change channels or access a different media asset from a different media source, e.g., changing channels, the media guidance application generates for display on display 100 a recording prompt 104. For example, in response to a user watching "Lord of the Rings I" on channel 123 and then deciding to switch to channel 125, the media guidance application may generate for display on display 100 a recording prompt 104 which reads "Would you like to record "Lord of The Rings I" before changing channels?." In another example, the recording prompt 104 may include selectable options "yes" and "no." In yet another example, the recording prompt 104 may provide the user with options to record the media asset, e.g., "Lord of the Rings I" locally, or if a copy of "Lord of the Rings I" is already available from another source, e.g., a media-on-demand server, to download the available copy of "Lord of The Rings I."

In another example, the media guidance application may switch channels to channel 125 as requested based on user input, and the media guidance application may generate for display the recording prompt 104 after the media guidance application is already generating for display the programming associated with channel 125. In this example, the media guidance application may begin recording the "Lord of The Rings I" automatically, and in response to the user input to record or not record, the media guidance application may either continue recording or delete the recording initiated by the channel change.

In another example, when receiving a user input to access a media asset from a different media source, e.g., change channels, the media guidance application may generate for display the program initially generated for display, e.g. "Lord of the Rings I" in a picture-in-picture window, with the new program, e.g., programming from channel 125, generated for display in full screen along with prompt 104, e.g., with prompt 104 as an overlay.

In another example, when receiving a user input to access a media asset from a different media source, e.g., change channels, the media guidance application may determine what the current media source is, prior to determining whether to generate for display prompt 104. For example, Josh may have indicated via the media guidance application settings or from his viewing habits that "Animal Planet" is one of his favorite channels. In this example, when the media guidance application receives from Josh a request to switch from "Animal Planet" to the "Weather Channel," the media guidance application may determine that "Animal Planet" is a favorite channel, and automatically begin recording "Animal Planet" prior to generating for display the "Weather Channel" programming, without a need for a prompt.

In this example, if the media guidance application was generating for display for Josh the "CW network" which is not one of Josh's favorites, and the media guidance application received a request from Josh to switch from the "CW Network" to "Channel 28," the media guidance application may determine that the "CW Network" is not a favorite of Josh's, and would generate for display a prompt, asking Josh whether he wishes to record the programming from the "CW Network" prior to switching to "Channel 28." Similarly, in some examples, the media guidance application may determine whether a media content source a user is switching to is a favorite, and the media guidance application may later use this determination to again automatically store the favorite programming in case of an interruption.

In other examples, the media guidance application may determine a relative importance of the source of the media content initially being watched and a relative importance of the source of the media content that a user requests to access via the media guidance application. For example, the media guidance application may rank news broadcast programming as less important than the "SciFi Network." In another example, a particular source of content may be indicated to be lower in a user's list of preferences than another source of media content. In some examples these preferences may be user specific, time specific, location specific, or device specific. For example, Daniel may indicate that if he is watching the "SciFi Network" on his iPad and if the media guidance application receives a request to access different content from a different source, e.g., CNN.com, the "SciFi Network" programming should be recorded. Similarly in this example, Daniel may indicate that if he is watching the "SciFi Network" on his iPad and if the media guidance application receives a request to access different programming on the "Supernatural Network," the "SciFi Network" programming need not be recorded, e.g., because Daniel much prefers the "Supernatural Network" to the "SciFi Network."

In another example, the media guidance application may continue to generate for display the program initially generated for display, e.g., "Lord of the Rings I" in full screen with display prompt 104 as an overlay, while the new program, e.g., programming from charnel 125, is generated for display in a picture-in-picture window.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the tem "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
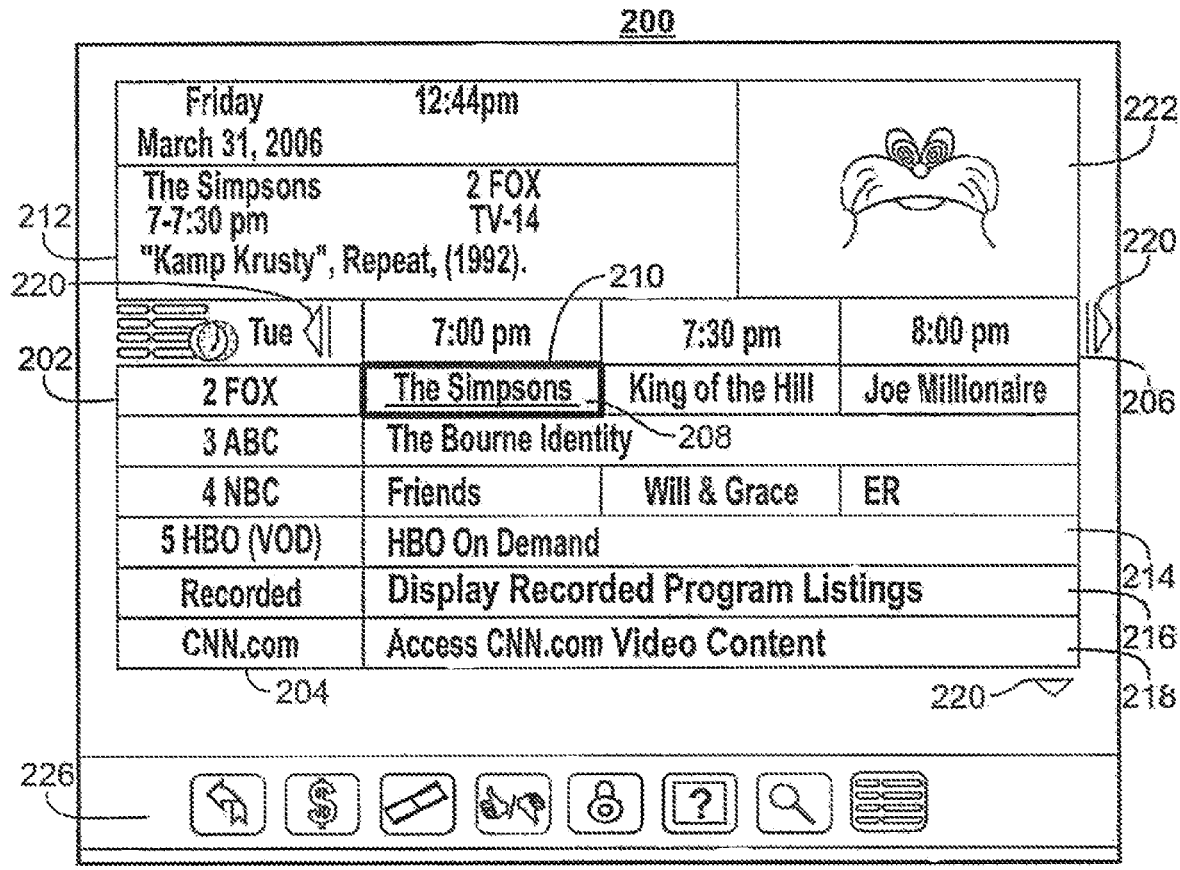
FIG. 2 shows an illustrative example of a display screen for use in accessing media content, in accordance with some embodiments of the disclosure.
Figure 3:
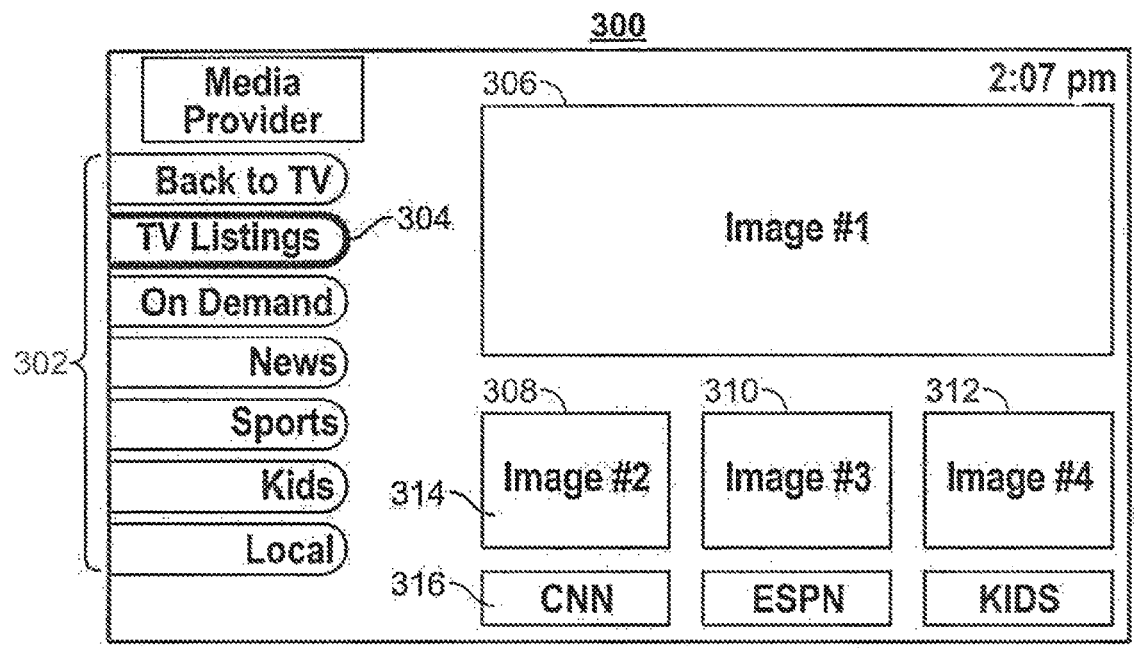
FIG. 3 shows another illustrative example of a display screen used access media content, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identities a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manlier as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued. May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316, Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
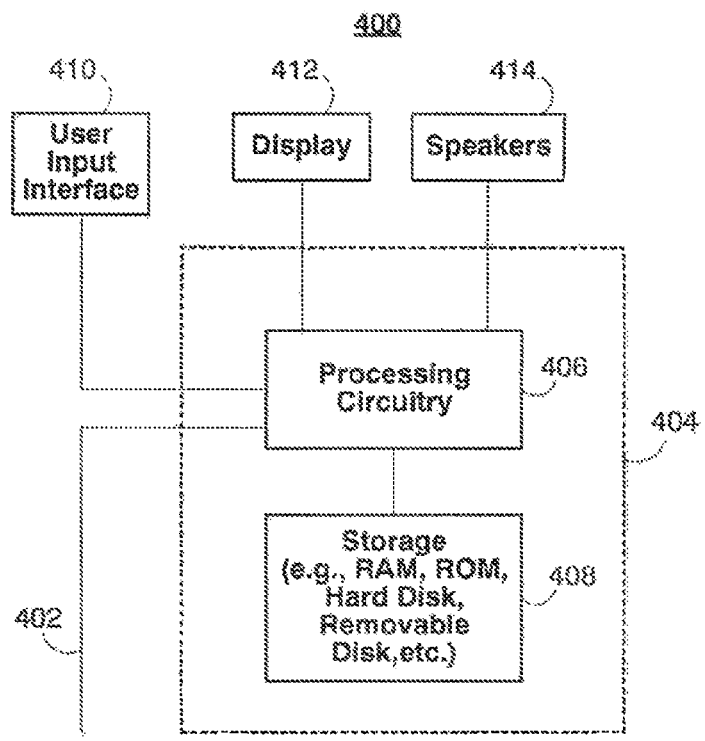
FIG. 4 is a block diagram of an illustrative user equipment device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel. Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BUJ-RAY disc (BD) recorders, BLU-RAY 31) disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
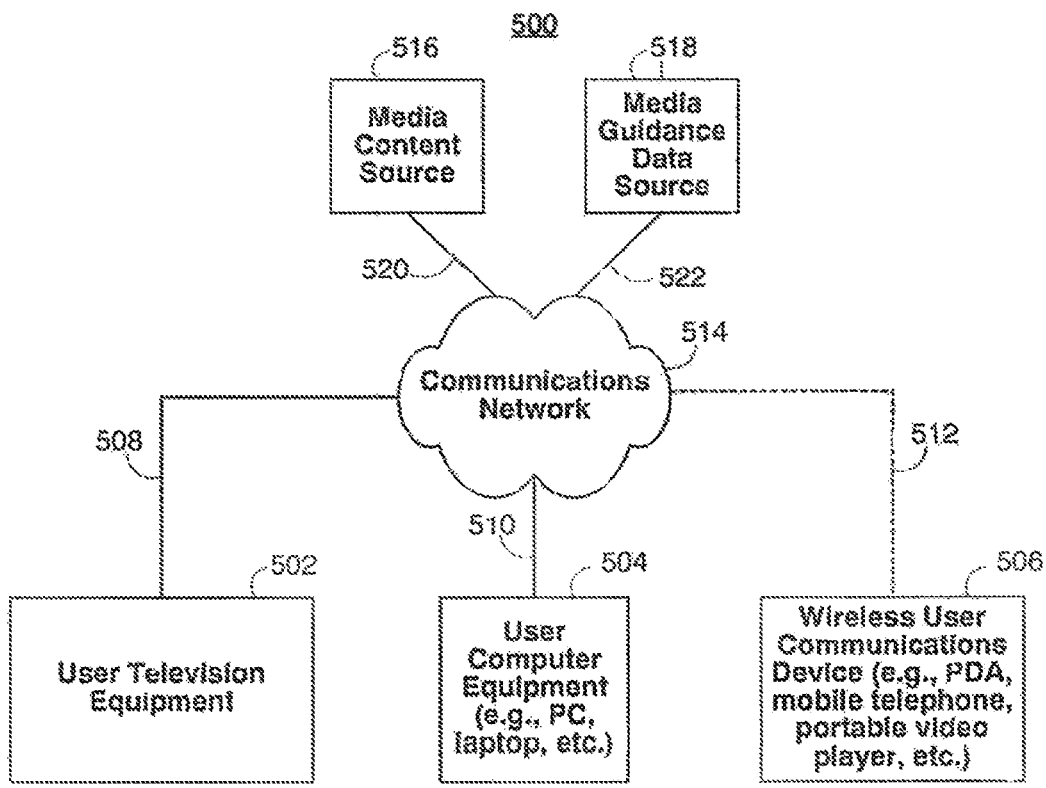
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaining machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Media content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user equipment, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred to herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
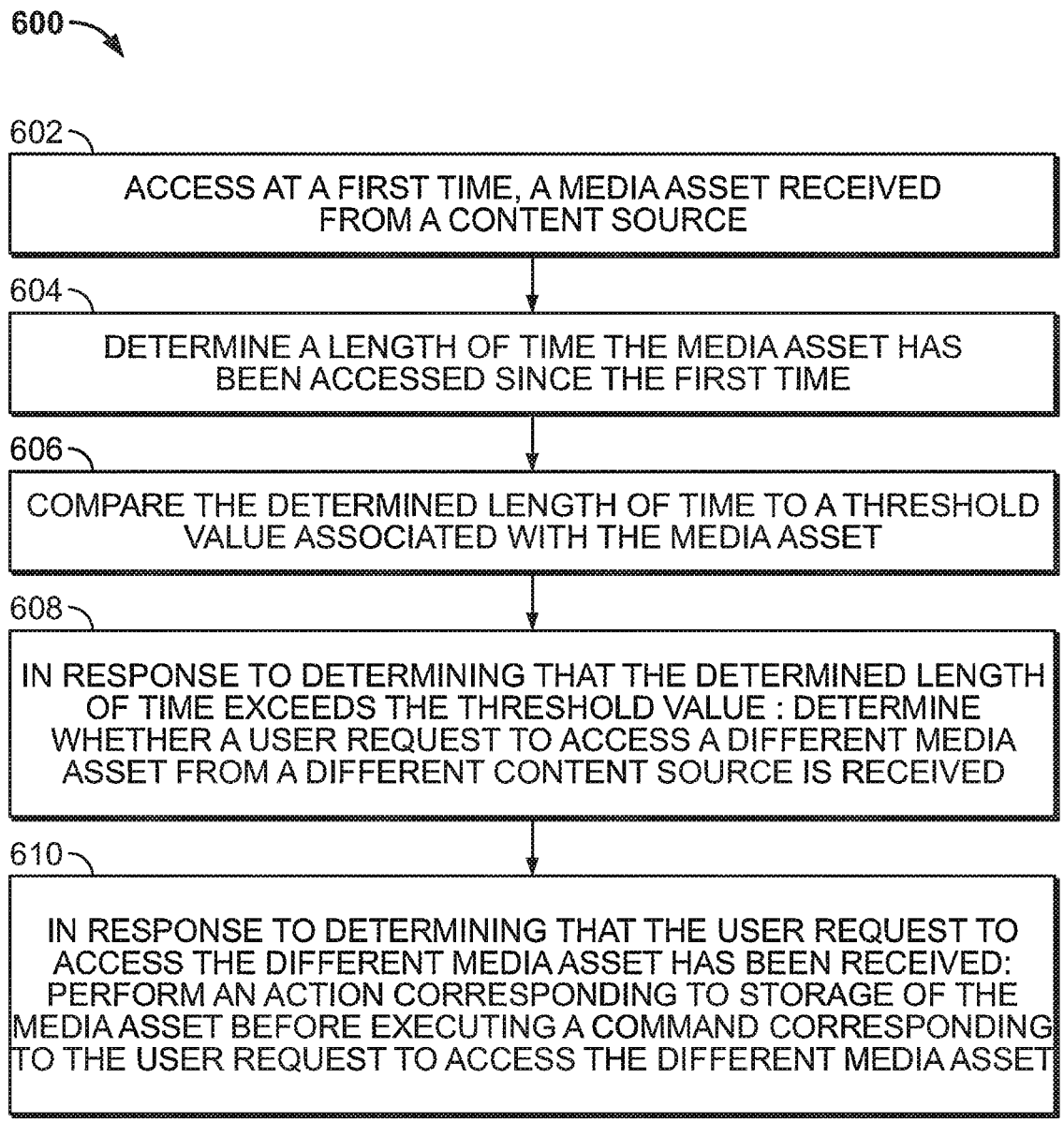
FIG. 6 is a flowchart of illustrative steps for storing content, in accordance with some embodiments of the disclosure.

FIG. 6 is a flowchart of illustrative steps for storing content, in accordance with some embodiments of the disclosure. Process 600 begins at step 602, where the media guidance application accesses, at a first time, e.g., using processing circuitry 406, a media asset received from a content source, e.g., media content source 516. For example, the media guidance application may access a movie received from a media source, such as a broadcast channel or an http link. For example, a user may use the media guidance application to request to access a particular episode of a series from hbogo.com. In another example, a user may use the media guidance application to request to tune to a particular channel and access the program currently being broadcast on that particular channel. For example, the first time at which the media asset is accessed may be when the media asset is generated for display to the user. For example, when the media guidance application generates for display to the user a media asset at a first time, the media guidance application may create a data structure, which may store identifiers of the media asset, the media source, and the first time.

In another example, the first time at which the media asset is accessed may be when the user uses the media guidance application to select a particular media source. For example, the first time at which the media asset is accessed may be defined as the time at which the media guidance application receives a user command, e.g., via a user input device, via a voice command, via facial recognition, etc., to access a media asset. For example, a user says "play my favorite movie," or "play my MIR recording," or "tune to the CW network." In another example, the media guidance application detects that a user's facial expression indicates boredom, and, based on this determination, accesses the Comedy Central network and generates for display comic programming. For example, when receiving one of the above, exemplary, user inputs to access new media from a new media source, the media guidance application may access the data structure created at the first time the media guidance application generated for display to the user the initial media asset. In this example, the media guidance application may access the data structure, and search the fields for the first time field.

Process 600 continues to step 604, where the media guidance application determines, e.g., with processing circuitry 406, a length of time the media asset has been accessed since the first time. For example, the media guidance application may determine that the current time is 8:00 am, and that a user first accessed ABC News at 07:45 am. For example, the media guidance application may determine that the user first accessed "ABC News" at "07:45 am" by accessing a data structure created at "07:45 am" when the media guidance application first generated for display for the user "ABC News", as indicated by a field in the data structure, and/or metadata associated with the creation of the data structure itself. The media guidance application may determine, from metadata associated with the media asset and/or the user requests, what was accessed the first time by the media asset. For example, the media guidance application may determine that "ABC News" was first accessed at "07:45 am." Similarly, the media guidance application may determine, from an external source, what the current time is. For example, the media guidance application may determine, from a system clock, that the current time is "08:00 am," In another example, the media guidance application may determine, from data broadcasted by "ABC News", that the current time is "08:00 am."

The media guidance application may determine, e.g., with processing circuitry 406, a difference between the current time, e.g., "8:00 am" and the first time the user accesses "ABC News," e.g., "07:45 am," and determine a length of time that "ABC News" has been accessed since the first time, e.g., "15 minutes." In another example, the media guidance application may also determine, from metadata associated with a media source, whether a particular program has been watched for a specific period of time. For example, the media guidance application may determine not only a difference between the current time and a first time at which a particular media source, e.g., "ABC News," was accessed, but also a difference between the current time and a time at which a particular program, e.g., "Good Morning America," for that particular media source was accessed.

Process 600 continues to step 606, where the media guidance application compares the determined length of time to a threshold value associated with the media asset. For example, the threshold value associated with the media asset may be stored in a database on storage 408. The media guidance application may compare the determined length of time to the retrieved threshold value, stored e.g., in storage 408. For example, for the news broadcast "Good Morning America" with a determined characteristic of "news programming," if the threshold value stored in the access time threshold field associated with the identified given media characteristic field "news programming" is "5 minutes" and the media guidance application has determined that the length of time the media asset, e.g., "Good Morning America" has been accessed since the first time is greater than 10 minutes, e.g., 20 minutes, the media guidance application may compare the determined length of time "20 minutes" to the time threshold "10 minutes." For example, the time threshold for a particular program may be based on program type, with news program having shorter threshold times than movies or documentaries. In another example, the time threshold for a program may be based on popularity relative to a particular user, or to multiple users.

For example, the time threshold for particular programs may be customized based on user preference by type and/or program name and/or popularity. For example, one user might set a low threshold period of time for "news programming" between "7 am-9 am." Another user may set a low threshold period of time only for "Good Morning America." Yet another user may set a higher threshold for "Good Morning America."

As described above with respect to FIG. 1, in some examples, the media guidance application may determine which source is providing the media asset initially generated for display, and which new source is accessed to provide the next media asset requested for display. For example, the media guidance application may have pre-configured preferences and/or rules, indicating that when a user requests to switch from a sports channel to a news channel, the sports channel should be recorded, but when a user requests to switch from a news channel to any other channel, the news channel need not be recorded. In other examples, the preferences and/or priorities of the different content sources (e.g., media-on-demand server, channel, recording, etc.) may be generic to the media guidance application, but may also be user specific, and may be customized based on user-selected preferences or user viewing history.

Process 600 continues to step 608, where, in response to determining that the determined length of time exceeds the threshold value, the media guidance application determines whether a user request to access a different media asset from a different content source is received. For example, the media guidance application determines that the length of time the media asset, e.g., "Mission Impossible III" has been accessed since the first time is "25 minutes," and the media guidance application determines that the determined length of time "25 minutes" is greater than the value stored in the access time threshold field associated with the identified given media characteristic field "Tom Cruise" for that particular user, which is "8 minutes." in this example, the media guidance application determines whether a user request to access a different media asset from a different content source is received.

For example, a different media asset from a different content source may be a media asset on a different channel, a broadcast media asset instead of a media-on-demand media asset, a local media asset instead of a remote media asset, etc. For example, the media guidance application may receive a user request to tune to another channel, or the media guidance application may receive a user request to navigate to a different category of media assets. In another example, the media guidance application may receive a user request from a different user or a different device. For example, a media guidance application generating for display "Good Morning America," as described for example above, may receive a request from a user on a second screen device to change the channel to the "Cooking Channel." Alternatively, in another example the media guidance application generating for display "Good Morning America" while a secondary user, e.g., John, is logged in, may receive a request from a primary user, Maria, to access a previously recorded episode stored on a server, with Maria's request overriding John's previous selection for display.

Process 600 continues to step 610, where in response to determining that the user request to access the different media asset has been received, the media guidance application performs an action corresponding to storage of the media asset before executing a command corresponding to the user request to access the different media asset. For example, in response to determining that the user, e.g., requested to access a DVR recording, the media guidance may perform an action corresponding to storage of the media asset previously generated for display. For example, if the media guidance application was previously generating for display "Good Morning America" but the user requested to access a stored copy of "Greys Anatomy, Season 7, episode 1," the media guidance application may begin recording a copy of "Good Morning America," or the media guidance application may download a remote recording of "Good Morning America," or the media guidance application may record "Good Morning America" at a remote location.

The media guidance application may provide a prompt to a user to decide whether to record the media asset before executing a command corresponding to the user request to access the different media asset. For example, when the media guidance application generating for display "Good Morning America" receives the request to access "Greys Anatomy, Season 7, episode 1" from the user's DVR or network storage area, the media guidance application may generate for display a prompt on whether to record "Good Morning America." The action corresponding to storage of the media asset may include generating for display a recording prompt. For example, the prompt may be tailored to the specific program generated for display "Do you want to record Good Morning America," or more generic "Do you want to continue watching this later." For example, the prompt may include generic selectable options such as a "yes" selectable button and a "no" selectable option. In another example, the prompt may include a "record now" option to record immediately, a "download copy" option if a copy of the program is available, a "set reminder" option, if the program will be available at a later time.

The media guidance application may perform this action corresponding to storage of the media asset before executing a command corresponding to the user request to access the different media asset, e.g., a channel change, a selection of a different device or network, etc. For example, John may have selected to watch the recorded episode of "Greys Anatomy" on a second screen device, e.g., an iPad or a phone. In another example, the command corresponding to the user request to access the different media asset may be a command to access an application on the media guidance application, such as an email application, or a phone application. For example, John may have been watching "Good Morning America" before requesting to access his email and entailing his boss at work.

In another example, Lydia may have been watching a live broadcast of "'Jeopardy'" which airs at 07:00 pm before realizing at 7:15 pm that she is late to pick up her husband from the airport, and selecting to turn off the television. In this example, a prompt such as "Do you wish to record 'Jeopardy'" would allow Lydia to watch the remainder of Jeopardy when she returns to her home.

In another example, Tim may have been watching "Pirates of the Caribbean" on "Showtime," when he realizes that the presidential debate is about to start, and he exclaims "Shoot, the debate is starting." In this example, the media guidance application may analyze Tim's speech and cross-reference his words with a database of current media programming and live social media feeds, to determine that Tim may be interested in switching channels to watch the presidential debate. However, the media guidance application may confirm whether Tim wishes to switch channels to watch the presidential debate by first generating for display a prompt such as "It sounds like you want to watch the debate. Do you want to record 'Pirates of the Caribbean'?" In this example, Tim could respond yes or no, either by speaking and/or by using another user input device.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIG. 6.

Figure 7:
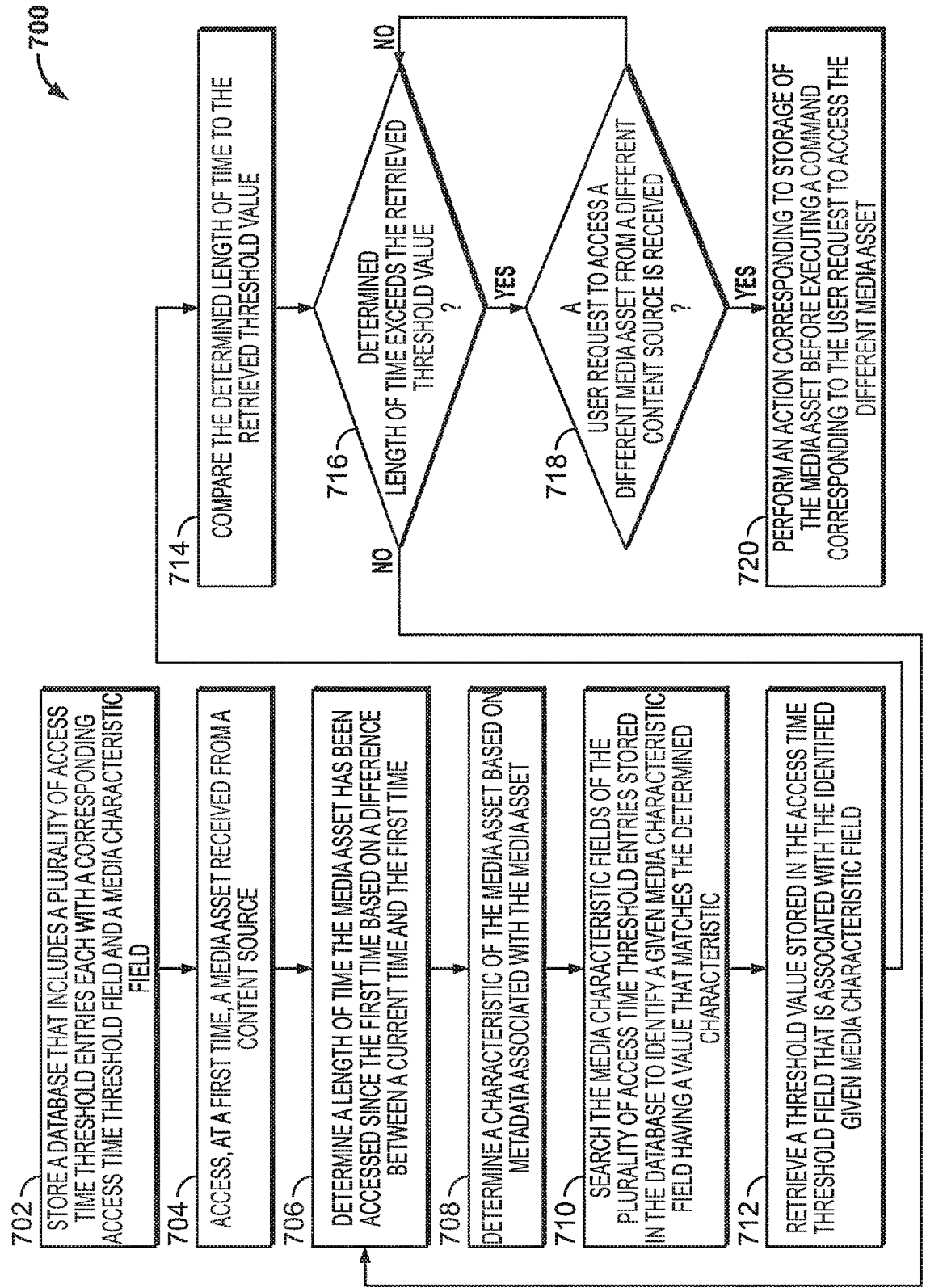
FIG. 7 is another flowchart of illustrative steps for storing content, in accordance with some embodiments of the disclosure.

FIG. 7 is another flowchart of illustrative steps for storing content in accordance with some embodiments of the disclosure. Process 700 starts at step 702, where the media guidance application stores a database, e.g., on storage 408, that includes a plurality of access time threshold entries, each with a corresponding access time threshold field and a media characteristic field.

For example, an access time threshold entry stored in the database, e.g., stored on storage 408, may include a media characteristic field which is "movie," and the corresponding associated time threshold field. The database may also include an access time threshold field of "5 minutes" for a series episode, and a corresponding media characteristic field which is "episode." An access time threshold field may range from a few seconds to a few minutes, to an hour.

In another example, an access time threshold field may be defined as a percentage of the length of a media asset. For example, for a media asset with a media characteristic field of "movie," the access time threshold field may be defined as "25%" of the run time for the movie. For example, for a media asset with a media characteristic field of "documentary," the access time threshold field may be defined as "10%" of the run time for the documentary.

For example, the database, e.g., stored on storage 408, may be automatically updated based on metadata provided by media providers. In some examples, the database may also be updated based on user input for certain types of media asset and/or taking into account particular user preferences. For example, a standard access time threshold field for all "action movies" may be "10 minutes," but if Lloyd has a short attention span, at Lloyd's request, the media guidance application may update the access time threshold field for "action movies" to be "5 minutes" when Lloyd is watching a media asset generated for display by the media guidance application. In some examples, the access time threshold fields may also be determined as a combination of certain conditions being fulfilled. For example, if the media guidance application determines that multiple users are watching a horror movie generated for display, the access time threshold field for "horror movie" and "multiple users" may be greater, e.g., "15 minutes" than the access time threshold field for "horror movie" and "single user," e.g., "8 minutes."

Process 700 continues to step 704, where the media guidance application accesses at a first time, a media asset received from a content source. For example, as described above, the media guidance application may receive a user request to access "Mission impossible, III" from a media-on-demand server. In another example, the media guidance application may receive a user request to tune to a particular channel and access the program currently being broadcast on that particular channel.

Process 700 proceeds to step 706, where the media guidance application determines a length of time the media asset has been accessed since the first time, based on a difference between a current time and the first time. For example, the media guidance application may determine that the current time is "12:00 pm," and that a user first accessed the "C-SPAN" channel at "11 am." The media guidance application may determine from metadata associated with the media asset and/or the user requests what was the first time that the media asset was accessed. For example, the media guidance application may determine that, when the user turned on the media guidance application, the media guidance application generated for display "C-SPAN," and no further channel changes were received since then.

In some examples, the media guidance application may take into account only periods of time during which the user is active, either interacting with the media guidance application by inputting commands, e.g., adjusting volume, browsing the channel guide, etc., or the media guidance application determines that the user is active, e.g., present in the room and watching the display screen instead of snoring on the couch. Similarly, the media guidance application may determine what the current time is, either from an internal or external clock, and/or from metadata associated with the media asset being generated for display. The media guidance application may determine a difference between the current time, e.g., "12:00 pm" and the first time the media was accessed, e.g., "11:00 am," and determine a length of time the media asset has been accessed since the first time, e.g., "1 hour." As mentioned above, in some examples, the media guidance application may, instead, determine a difference between the current time, e.g., "12:00 pm," and the earliest time the user was actively watching the current media asset, e.g., at "11:50 am," because the user was not active, e.g., fell asleep and/or went to the kitchen, between "11:00 am" and "11:50 am."

Process 700 proceeds to step 708, where the media guidance application determines a characteristic of the media asset based on metadata associated with the media asset. For example, the "C-SPAN" channel may have metadata associated with it including the channel type, e.g., "political," "federal," "local," etc. The particular session or program generated for display at a particular time via C-SPAN may also be captured by the characteristic "midday," "special session," etc.

Process 700 proceeds to step 710, where the media guidance application searches the media characteristic fields of the plurality of access time threshold entries stored in the database, to identify a given media characteristic field having a value that matches the determined characteristic. For example, if the determined characteristic of the programming generated for display on "C-SPAN" is "government programming" the media guidance application may search the media characteristic field of the plurality of access time threshold entries stored in the database to identify an access time threshold entry with a given media characteristic field that matches "government programming." In some examples, each access time threshold entry may have an identifier, e.g., a reference. In this example, if the determined characteristic of the programming generated for display on "C-SPAN" is "government programming" the media guidance application may search the media characteristic field of the plurality of access time threshold entries, until the media guidance application identifies the access time threshold entry ID No. 123672, which has a given media characteristic field that matches "government programming" in another example, if the determined characteristic of the media asset is "advertising" because "C-SPAN" is on break, or another channel is showing commercials, the media guidance application may search the media characteristic field of the plurality of access time threshold entries stored in the database to identify the access time threshold entry with a given media characteristic field that matches "advertising" and/or "commercial."

Process 700 proceeds to step 712, where the media guidance application retrieves a threshold value stored in the access time threshold field that is associated with the identified given media characteristic field. For example, for the "C-SPAN" programming generated for display with a determined characteristic of "government programming," the media guidance application identified the access time threshold entry with the given media characteristic field "government programming," e.g., access time threshold entry ID No. 123672, and the media guidance application accesses the threshold value stored in the access time threshold field associated with the identified given media characteristic field "government programming" may be "1.5 hours" for that identified access time threshold entry. In another example, for a online shopping channel with the determined characteristic of the media asset being "shopping" and/or "commercials," the media guidance application, having searched for and identified an access time threshold entry with a media characteristic field "shopping" which matches the determined characteristic for the shopping channel, retrieves the threshold value stored in the access time threshold field associated with the identified given media characteristic field "shopping" and/or "commercials" may be "45 minutes" for that identified access time threshold entry.

Process 700 proceeds to step 714, where the media guidance application compares the determined length of time to the retrieved threshold value, retrieved from the access time threshold field associated with the media characteristic field as part of an access time threshold entry. For example, for the "C-SPAN" programming with a determined characteristic of "government programming," if the threshold value stored in the access time threshold field associated with the identified given media characteristic field "government programming" is "1.5 hours" and the media guidance application has determined what is the length of time that the media asset, e.g., the "C-SPAN" programming has been accessed since the first time, the media guidance application may compare the determined length of time, e.g., "30 minutes" or "1.7 hours" to the time threshold for "government programming," e.g. "1.5 hours." For example, the media guidance application searches through multiple access time threshold entries for a value of the media characteristic field which matches "government programming" and once an access time threshold entry with a media characteristic field which matches "government programming" has been identified, the media guidance application accesses the corresponding access time threshold field from this same access time threshold entry.

Process 700 proceeds to step 716, where the media guidance application determines whether the length of time exceeds the retrieved threshold value. If the determined length of time does not exceed the retrieved threshold value, process 700 returns to step 706. For example, as described above, if a user has only been watching "C-SPAN" for "1 hour," but the threshold value associated with "government programming" which is the characteristic for C-SPAN is "1.5 hours," process 700 returns to step 706 and again determines a length of time the C-SPAN channel has been accessed since the first time, based on a difference between the current time and the first time. As mentioned above, in some examples, the difference may be computed between the current time and the last inactive time, i.e., to compute a difference which captures time during which the user is active, e.g., interacting with the media guidance application, physically present in the room, or not otherwise distracted.

If the determined length of time exceeds the retrieved threshold value listed in the access time threshold field of the identified access time threshold entry with the matching media characteristic field, process 700 proceeds to step 718. For example, as described above, if the user has been watching a shopping channel for 50 minutes, the media guidance application determines that the length of time the media asset, e.g., "Shop Til You Drop" has been accessed since the first time is 50 minutes, and the media guidance application determines that the determined length of time "50 minutes" is equal or greater than the value stored in the access time threshold field associated with the identified given media characteristic field "Shopping," which may be "45 minutes."

At step 718, the media guidance application determines whether a user request to access a different media asset from a different content source is received. For example, a different media asset from a different content source may be a media asset on a different channel, a broadcast media asset instead of a media-on-demand media asset, a local media asset instead of a remote media asset, etc.

If a user request to access a different media asset from a different content source is not received, process 700 returns to step 716, where the media guidance application determines whether the determined length of time exceeds the retrieved threshold value.

If a user request to access a different media asset from a different content source is received, process 700 proceeds to step 720, where the media guidance application performs an action corresponding to the storage of the media asset before executing a command corresponding to the user request to access the different media asset.

At step 720, the media guidance application performs an action corresponding to the storage of the media asset before executing a command corresponding to the user request to access the different media asset. For example, in response to determining that the user, e.g., requested to access a different channel, the media guidance may perform an action corresponding to storage of the media asset. For example, the media guidance application may store a link or pointer to a stored copy of the media asset, or the media guidance application may download locally a remote recording of the media asset, or the media guidance application may record remotely the media asset. For example, if a user is interrupted and/or distracted while watching "When Harry met Sally" one action corresponding to storage of the media asset may be to store a link to a network copy of "When Harry Met Sally" so the user may continue watching later. In another example, another action corresponding to storage of the media asset may be to store locally a copy of "When Harry Met Sally."

The media guidance application may provide a prompt to a user to decide whether to store the media asset before executing a command corresponding to the user request to access the different media asset. The action corresponding to storage of the media asset may include generating for display the prompt, and/or an action corresponding to a user selection of an option to record as indicated on the prompt, e.g., by a "yes" selectable button. The media guidance application may perform this action corresponding to storage of the media asset before executing a command corresponding to the user request to access the different media asset, e.g., a channel change, a selection of a different device or network, etc.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIG. 7.

Figure 8:
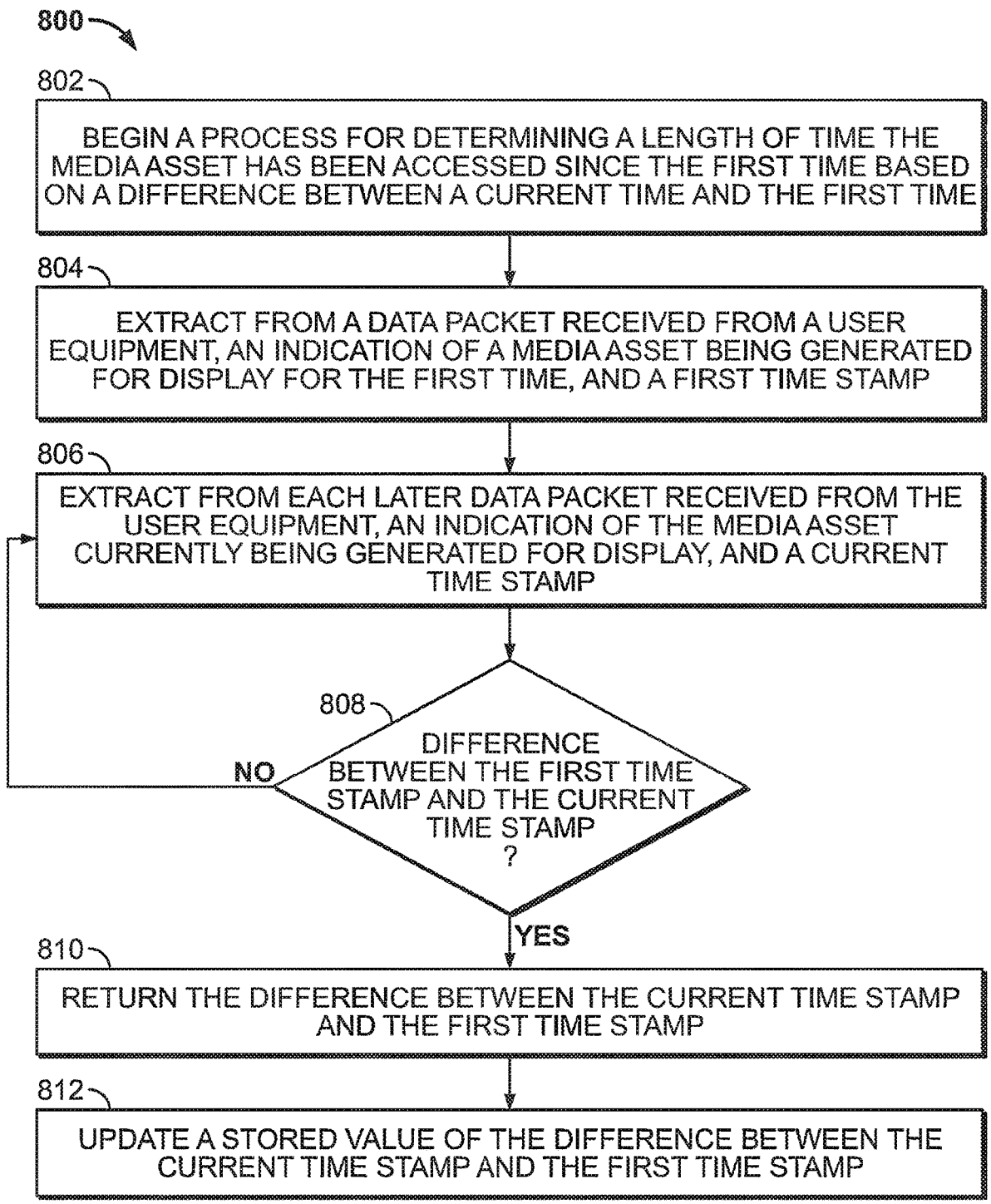
FIG. 8 shows an illustrative example of determining a length of time the media asset has been accessed since the first time based on a difference between a current time and the first time, in accordance with some embodiments of the disclosure.

FIG. 8 shows an illustrative example of determining a length of time that the media asset has been accessed since the first time based on a difference between a current time and the first time, in accordance with some embodiments of the disclosure. Process 800 starts at step 802, where the media guidance application begins a process for determining a length of time the media asset has been accessed since the first time, based on a difference between a current time and the first time. For example, at step 802, the media guidance application begins a process for determining a length of time the media asset has been accessed by a particular user since the first time this particular user started watching the media asset. Process 802 then proceeds to step 804, where the media guidance application extracts from a data packet received from a user equipment, an indication of a media asset being generated for display for the first time, and a first-time stamp. For example, the media guidance application extracts from a data packet received from a user's set top box, a request to tune to a particular channel, e.g., "National Geographic Channel," with a first-time stamp, e.g. "08:55 pm."

Process 800 then proceeds to step 806, where the media guidance application extracts from each later data packet received from the user equipment, an indication of the media asset currently being generated for display, and a current-time stamp. For example, at regular intervals, e.g., at each of "08:56 pm," "08:57 pm," etc. the media guidance application receives data packets from the user equipment and extracts an indication that "National Geographic Channel" is still being generated for display, and/or that the user is still paying attention, along with a current-time stamp, e.g., "08:56 pm," "08:57 pm," etc. Process 800 then proceeds to step 808, where the media guidance application determines whether there is a difference between the first-time stamp and the current-time stamp.

If there is no difference between the first-time stamp and the current-time stamp, process 800 returns to step 806, where the media guidance application extracts from each later data packet received from the user equipment, an indication of the media asset currently being generated for display, and a current-time stamp. However, if there is a difference between the first-time stamp, e.g., "08:55 pm" and the current-time stamp, e.g. "09:10 pm," process 800 proceeds to step 810, where the media guidance application returns the difference between the current-time stamp and the first-time stamp, e.g., "15 minutes." Process 800 then proceeds to step 812, where the media guidance application updates a stored value of the difference, e.g., stored in a database in store 408, between the current-time stamp and the first-time stamp. For example, between "09:10 pm" and "09:11 pm," the media guidance application updates a storage value of the difference between the current-time stamp and the first-time stamp from "15 minutes" to "16 minutes."

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIG. 8.

Figure 9:
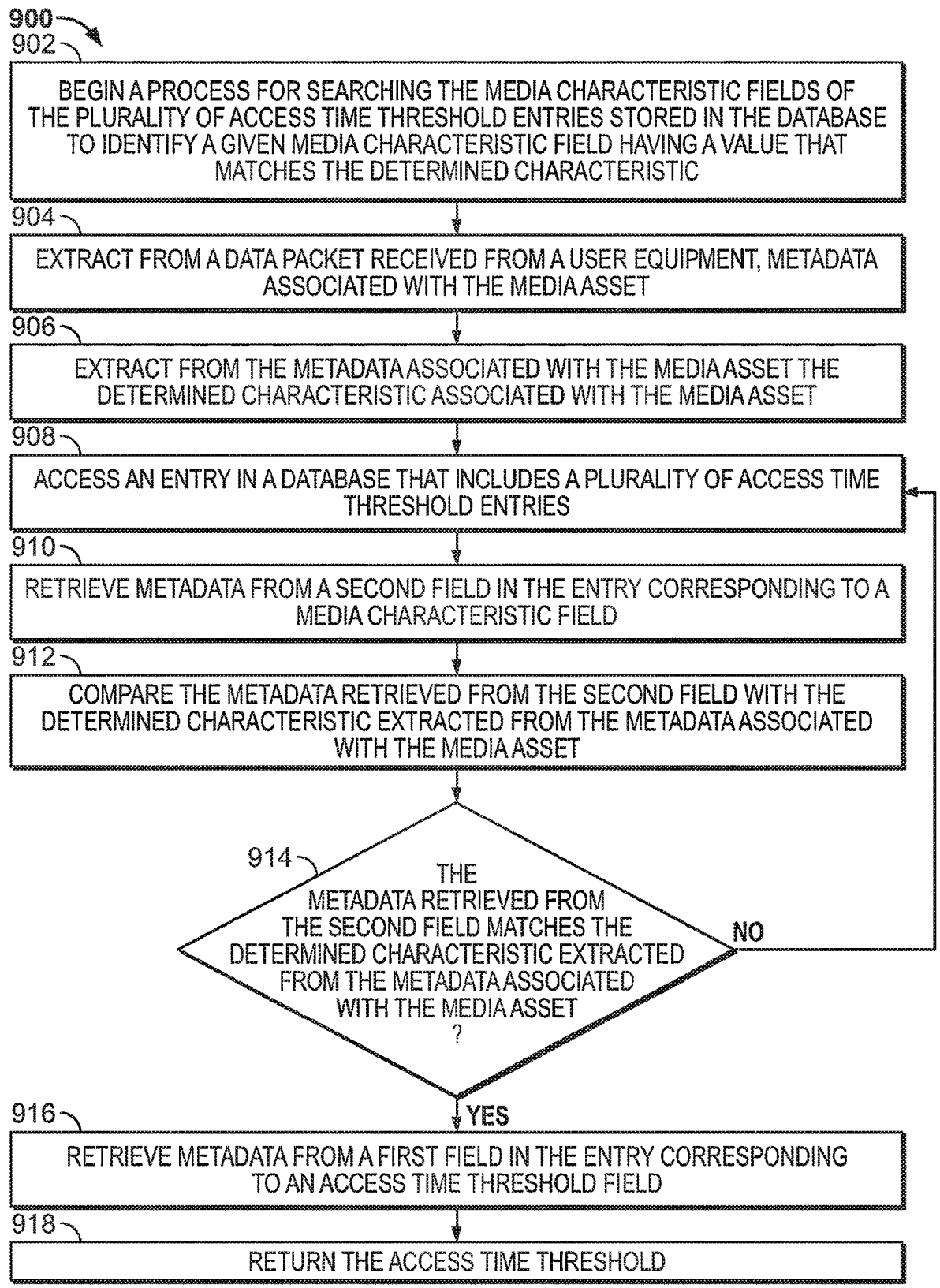
FIG. 9 shows an illustrative example of searching the media characteristic fields of the plurality of access time threshold entries stored in the database to identify a given media characteristic field having a value that matches the determined characteristic, in accordance with some embodiments of the disclosure.

FIG. 9 shows an illustrative example of searching the media characteristic fields of the plurality of access time threshold entries stored in the database to identify a given media characteristic field having a value that matches the determined characteristic, in accordance with some embodiments of the disclosure. Process 900 starts at step 902, where the media guidance application begins a process for searching the media characteristic fields of the plurality of access time threshold entries stored in the database to identify a given media characteristic field having a value that matches the determined characteristic. For example as described in some of the examples above, media characteristic field may be the media genre, title, actors, producers, date, awards, length, popularity, etc. For example, if the determined characteristic is "action movie," the media guidance application searches a database of access time threshold entries for an access time threshold entry with a media characteristic field which matches the determined characteristic, to identify a given media characteristic "action movie" that matches the determined characteristic "action movie." If the determined characteristic is "action movie" and the media characteristic field for a particular access time threshold entry in the database, e.g., stored in storage 408, does include "action," the media guidance application may determine that the determined characteristic "action" matches the stored media characteristic in the database.

In some examples, the media guidance application may be flexible about whether a given media characteristic field for an access time threshold entry matches the determined characteristic for a media asset. For example, if the determined characteristic is "action and adventure" but the media characteristic fields for the access time threshold entries in the database, e.g., stored in storage 408, only include "action" as the best match for "action and adventure," the media guidance application may determine that the determined characteristic "action and adventure" matches the media characteristic field "action," and may also add an access time threshold entry with a media characteristic field "action and adventure" to the database of access time threshold entries, for future reference. Process 900 then proceeds to step 904, where the media guidance application extracts from a data packet received from a user equipment, metadata associated with the media asset. For example, for a media asset such as "Mission Impossible III," the media guidance application extracts from a data packet associated with a user equipment, metadata including the determined characteristic "action."

Process 900 then proceeds to step 906, where the media guidance application extracts from the metadata associated with the media asset, the determined characteristic associated with the media asset. For example, as mentioned above, the media guidance application extracts from a data packet associated with a user equipment, metadata including the determined characteristic "action." Process 900 then proceeds to step 908, where the media guidance application accesses an access time threshold entry in a database, e.g., database stored on storage 408, that includes a plurality of access time threshold entries. For example, as described above, access time threshold entries include a media characteristic field which may be "comedy" or "documentary," etc., and also include an access time threshold field, which may be "10 seconds," "5%" of media asset completion, "20 minutes" or "1.7 hours," etc. In the example described above, the media guidance application may identify and access a particular time threshold entry from among the time threshold entries in the database. For example, as described in further detail below with respect to step 910, the media guidance application may go through the various access time threshold entries until the media guidance application identifies an access time threshold entry with a media characteristic field which matches the determined media characteristic, e.g., "action" for a given media asset, e.g., "Mission Impossible In," and retrieves from the same time threshold entry the access time threshold field, e.g., "20 minutes" associated with that media characteristic field.

Process 900 then proceeds to step 910, where the media guidance application retrieves metadata from a second field in the entry corresponding to a media characteristic field. For example, as described above the media guidance application may go through the various access time threshold entries until the media guidance application identifies an access time threshold entry with a media characteristic field which matches the determined media characteristic, e.g., "action" for a given media asset, e.g., "Mission impossible III," and retrieves from the same time threshold entry the access time threshold field, e.g., "20 minutes" associated with that media characteristic field. Process 900 then proceeds to step 912, where the media guidance application compares the metadata retrieved from the second field with the determined characteristic extracted from the metadata associated with the media asset. For example, in the example above, the media guidance application tray identify an access time threshold entry with a media characteristic field of "action and adventure," and the media guidance application then compares "action and adventure" from the second field (i.e., the media characteristic field) with the determined characteristic "action" extracted from the metadata associated with the media asset "Mission impossible III."

Process 900 then proceeds to step 914, where the media guidance application determines whether the metadata retrieved from the second field (the media characteristic field) of the access time threshold entry, e.g., "action and adventure" matches the determined characteristic, e.g., "action" extracted from the metadata associated with the media asset, e.g., "Mission Impossible III." If the metadata retrieved from the second field, the media characteristic field, does not match the determined characteristic extracted from the metadata associated with the media asset, process 900 returns to step 908. For example, if the metadata retrieved from the second field of the access time threshold entry in the example above was "Comedy" instead of "Action," process 900 may return to step 908, where it would continue to go through the different access time threshold entries in the database that includes a plurality of access time threshold entries, in search of an access time threshold entry with a second field, i.e., a media characteristic field, matching the determined media characteristic for the particular media asset, e.g., "action" for "Mission Impossible III."

If the metadata retrieved from the second field does match the determined characteristic extracted from the metadata associated with the media asset, process 900 proceeds to step 916, where the media guidance application retrieves metadata from a first field in the entry corresponding to an access time threshold field. As described above, if the metadata retrieved from the second (media characteristic) field, e.g., "action" or "action and adventure" of an access time threshold entry does match the determined characteristic, e.g., "Action," extracted from the metadata associated with the media asset, e.g., "Mission Impossible III" process 900 proceeds to step 918, where the media guidance application returns the value stored in the access time threshold field, e.g., "20 minutes" corresponding to the media characteristic field "action and adventure," i.e., the media guidance application returns the value stored in the first (access time threshold) field of the access time threshold entry identified because its second (media characteristic) field matches the determined media characteristic.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIG. 9.

Figure 10:
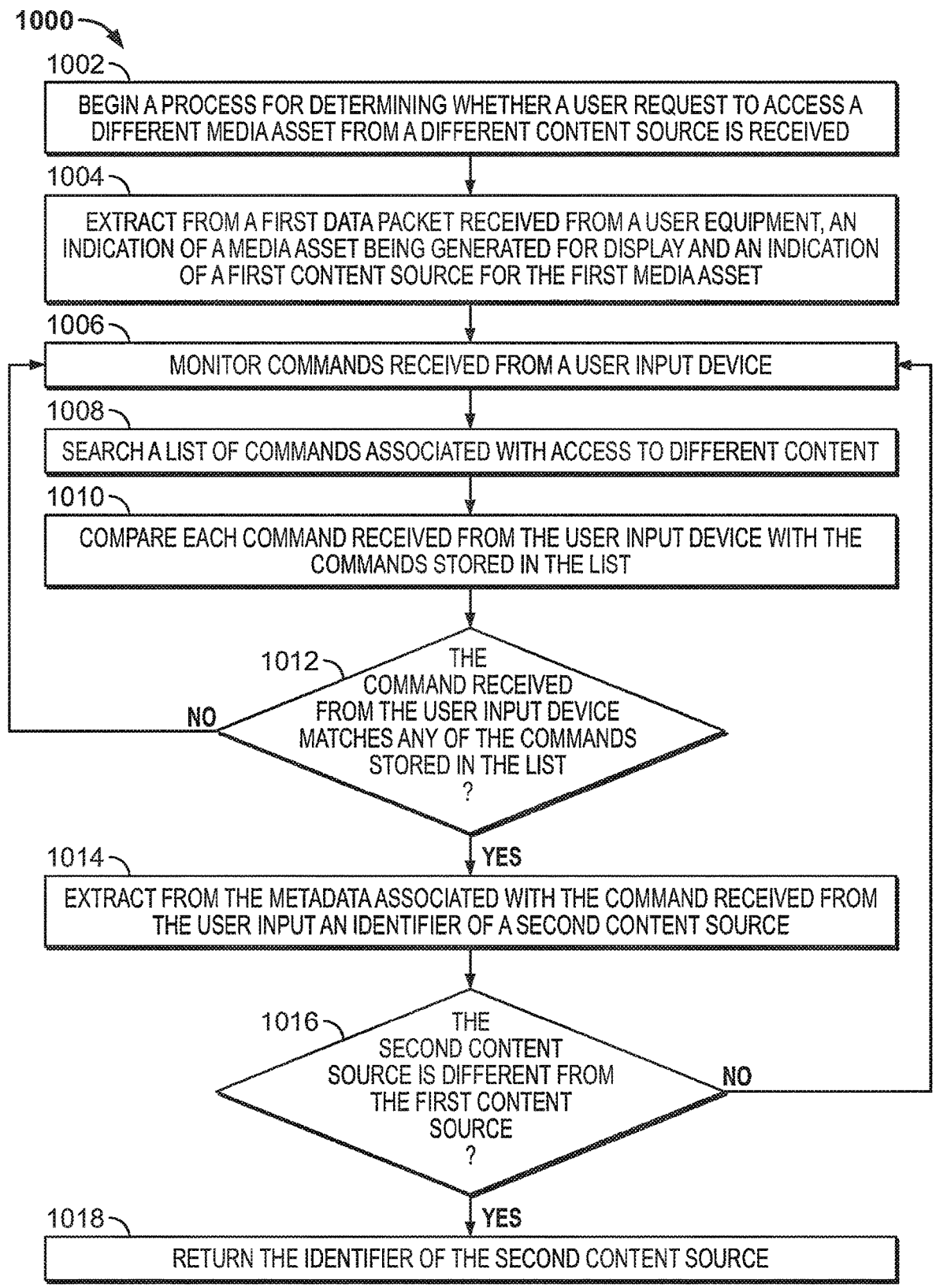
FIG. 10 shows an illustrative example of determining whether a user request to access a different media asset from a different content source is received, in accordance with some embodiments of the disclosure.

FIG. 10 shows an illustrative example of determining whether a user request to access a different media asset from a different content source is received, in accordance with some embodiments of the disclosure. Process 1000 starts at step 1002, where the media guidance application begins a process for determining whether a user request to access a different media asset from a different content source is received. For example, the media guidance application was previously generating for display for Sean "Ghost Adventures" at a time "after 09:00 pm," when the garage door opens, indicating that Padma is coming back from work late. Process 1000 proceeds to step 1004, where the media guidance application extracts from a first data packet received from a user equipment, an indication of a media asset being generated for display and an indication of a first content source for the first media asset.

In the example described above, the media guidance application extracts from a first data packet received from Sean's user equipment, an indication of "Ghost Adventures" being generated for display, and an indication of the content source for "Ghost Adventures," e.g. the "Supernatural Network." Process 1000 proceeds to step 1006, where the media guidance application monitors commands received from a user input device. In the example described above, a user input device may be the garage door, and the media guidance application may monitor a command received to open the garage door, e.g., to monitor a flag such as "GarageDoor" to determine whether "GarageDoorOpen=True."

Process 1000 then proceeds to step 1008, where the media guidance application searches a list of commands associated with access to different content. For example, as described above, a user may set certain preferences, and Sean may have defined a user preference to switch channels if the garage door opens "after 09:00 pm," so Padma does not find Sean watching "Ghost Adventures" when she gets home late from work, because she hates "Ghost Adventures."

Process 100 proceeds to step 1010, where the media guidance application compares each command received from the user input device with the commands stored in the list. For example, the media guidance application compares "open garage door after 09:00 pm" with a list of commands, which may include generic commands such as "channel up" and/or user-defined commands such as "open garage door after 09:00 pm."

Process 1000 proceeds to step 1012, where the media guidance application determines whether the command received from the user input device matches any of the commands stored in the list. If the command received from the user input device does not match any of the commands stored in the list, process 1000 returns to step 1006, where the media guidance application monitors commands received from a user input device. If the command received from the user input devices matches any of the commands stored in the list, process 1000 proceeds to step 1014, where the media guidance application extracts from the metadata associated with the command received from the user input an identifier of a second content source. For example, if the command is a "channel up," the media guidance application may extract from the metadata associated with the "channel up" command that the identifier is the identifier of the current channel, plus one.

In another example, such as the example described for Sean and Padma above, the media guidance application may extract metadata associated with the command "open garage door after 09:00 pm" that indicates that Sean sent a request to have the media guidance application generate for display a stored DVR recording, "Desperate Housewives, Season 4, Episode 8," which Padma happens to like. Process 1000 proceeds to step 1016, where the media guidance application determines whether the second content source is different from the first content source. For example, the media guidance application determines that the second content source, the DVR, is different from the first content source, a broadcast channel. If the second content source is identical to the first content source, process 1000 returns to step 1006, where the media guidance application again monitors commands received from a user input device.

However, if the second content source is different from the first content source, process 1000 proceeds to step 1018, where the media guidance application returns the identifier of the second content source. For example, the media guidance application returns the identifier of the "Desperate Housewives, Season 4, Episode 8" media asset.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 4-5 could be used to perform one or more of the steps in FIG. 10.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:
receiving a first request to access first content provided via a first content source;
determining, while causing the first content to be played based on the first request, that a second request to access second content available via a second content source has been received;
in response to (i) determining the second request has been received and (ii) determining the first content has been played for at least a threshold amount of time when the second request was received, performing a particular action to the first content;
determining, while causing the second content to be played based on the second request, that a third request to cease playing of the second content has been received; and
in response to (iii) determining the third request has been received and (iv) determining the second content has not been played for at least the threshold amount of time, declining to perform the particular action to the second content.

2. The method of claim 1, wherein the particular action performed to the first content is related to storage of the first content, and the particular action is performed to the first content without receiving a user request to record the first content.

3. The method of claim 2, wherein the particular action is performed prior to accessing the second content based on the second request.

4. The method of claim 1, further comprising:
determining a progression point within the playing of the first content at which the second request has been received,
wherein performing the action comprises storing a link that is selectable to resume the first content from the progression point.

5. The method of claim 1, wherein the first content is caused to be played at a user equipment device, and the performing the particular action comprises automatically recording the first content to a server that is remote from the user equipment device.

6. The method of claim 1, wherein determining that the first content has been displayed for the amount of time exceeding the threshold amount of time comprises:
storing a database that includes a plurality of playing time threshold entries each with a corresponding playing time threshold field and a media characteristic field;
determining a characteristic of the first content based on metadata associated with the first content, wherein the characteristic of the first content includes at least one of a title, a genre, a category, a duration, a size, a popularity, and a quality;
searching the media characteristic fields of the plurality of playing time threshold entries stored in the database to identify a given media characteristic field having a value that matches the determined characteristic; and
retrieving, as the threshold amount of time, a value stored in the playing time threshold field that is associated with the identified given media characteristic field.

7. The method of claim 1, wherein:
each of the second and third request is received via a media application;
the second request comprises a request to play, within the media application, the second content instead of the first content; and
the third request comprises:
a request to exit the media application; or
a request to play, within the media application, different content than the second content.

8. The method of claim 1, wherein:
the second content is played at a device when the device is in a powered-on state; and
the second request comprises a request to change the device from the powered-on state to a powered-off state.

9. The method of claim 1, wherein the first content source is a first channel, and the second content source is a second channel, each of the first channel and the second channel being accessible via a media application.

10. The method of claim 1, wherein determining whether the first, second, and third requests were received comprises monitoring external components.

11. A system comprising:
input/output circuitry configured to:
receive a first request to access first content provided via a first content source; and
control circuitry configured to:
determine, while causing the first content to be played based on the first request, that a second request to access second content available via a second content source has been received;
in response to (i) determining the second request has been received and (ii) determining the first content has been played for at least a threshold amount of time when the second request was received, perform a particular action to the first content;
determine, while causing the second content to be played based on the second request, that a third request to cease playing of the second content has been received; and
in response to (iii) determining the third request has been received and (iv) determining the second content has not been played for at least the threshold amount of time, declining to perform the particular action to the second content.

12. The system of claim 11, wherein the particular action performed to the first content is related to storage of the first content, and the particular action is performed to the first content without receiving a user request to record the first content.

13. The system of claim 12, wherein the control circuitry is configured to perform the particular action prior to accessing the second content based on the second request.

14. The system of claim 11, wherein the control circuitry is further configured to:
determine a progression point within the playing of the first content at which the second request has been received; and
perform the action by storing a link that is selectable to resume the first content from the progression point.

15. The system of claim 11, wherein the control circuitry is configured to cause the first content to be played at a user equipment device, and perform the particular action by automatically recording the first content to a server that is remote from the user equipment device.

16. The system of claim 11, wherein the control circuitry is configured to determine that the first content has been displayed for the amount of time exceeding the threshold amount of time by:
storing a database that includes a plurality of playing time threshold entries each with a corresponding playing time threshold field and a media characteristic field;
determining a characteristic of the first content based on metadata associated with the first content, wherein the characteristic of the first content includes at least one of a title, a genre, a category, a duration, a size, a popularity, and a quality;
searching the media characteristic fields of the plurality of playing time threshold entries stored in the database to identify a given media characteristic field having a value that matches the determined characteristic; and
retrieving, as the threshold amount of time, a value stored in the playing time threshold field that is associated with the identified given media characteristic field.

17. The system of claim 11, wherein:
each of the second and third request is received via a media application;
the second request comprises a request to play, within the media application, the second content instead of the first content; and
the third request comprises:
a request to exit the media application; or
a request to play, within the media application, different content than the second content.

18. The system of claim 11, wherein:
the second content is played at a device when the device is in a powered-on state; and
the second request comprises a request to change the device from the powered-on state to a powered-off state.

19. The method of claim 11, wherein the first content source is a first channel, and the second content source is a second channel, each of the first channel and the second channel being accessible via a media application.

20. The method of claim 11, wherein the control circuitry is configured to determine whether the first, second, and third requests were received by monitoring external components.

* * * * *